US010453126B2

(12) United States Patent
Latham et al.

(10) Patent No.: US 10,453,126 B2
(45) Date of Patent: Oct. 22, 2019

(54) CONTENT-RELATED FINANCIAL PORTAL

(75) Inventors: Corbin R. Latham, Parker, CO (US); Stewart W. Vardaman, Denver, CO (US)

(73) Assignee: DISH TECHNOLOGIES L.L.C., Englewood, CO (US)

(*) Notice: Subject to any disclaimer, the term of this patent is extended or adjusted under 35 U.S.C. 154(b) by 796 days.

(21) Appl. No.: 13/042,319

(22) Filed: Mar. 7, 2011

(65) Prior Publication Data

US 2012/0233048 A1 Sep. 13, 2012

(51) Int. Cl.
*G06Q 40/02* (2012.01)
(52) U.S. Cl.
CPC .................................. *G06Q 40/02* (2013.01)
(58) Field of Classification Search
CPC ...... G06Q 20/10; G06Q 20/102; G06Q 20/18; G06Q 20/4016; G06Q 20/405; G06Q 30/02; G06Q 30/0224; G06Q 30/0255; G06Q 40/00; G06Q 40/02; G06Q 50/184
See application file for complete search history.

(56) References Cited

U.S. PATENT DOCUMENTS

| | | | | |
|---|---|---|---|---|
| 7,567,658 B1* | 7/2009 | Hall et al. | | 379/143 |
| 7,752,048 B2* | 7/2010 | Sprague | | G06F 17/30421 704/201 |
| 8,615,711 B2* | 12/2013 | Lauridsen | | G06F 17/30873 709/224 |
| 2004/0015546 A1* | 1/2004 | Cotte | | 709/204 |
| 2005/0256797 A1* | 11/2005 | Tyulyaev | | G06Q 40/06 705/37 |
| 2008/0059380 A1* | 3/2008 | Bleahen | | G06Q 20/04 705/67 |
| 2009/0089838 A1* | 4/2009 | Pino, Jr. | | G06Q 30/02 725/40 |

(Continued)

FOREIGN PATENT DOCUMENTS

JP 2002063496 A * 2/2002

OTHER PUBLICATIONS

Djama et al. "Meet in the Middle Cross-Layer Adaptation for Audiovisual Content Delivery." IEEE Transaction on Multimedia, vol. 10, No. 1 (Jan. 2008).*

*Primary Examiner* — Virpi H Kanervo
(74) *Attorney, Agent, or Firm* — Seed Intellectual Property Law Group LLP

(57) ABSTRACT

A content receiver provides content received from a content provider. While providing such content, the content receiver determines to provide a financial portal. The content receiver ascertains context-specific information to include in the financial portal based on the content. Then, the content receiver transmits a combination of the financial portal and the content to a display device. The financial portal may include various menus and/or interfaces that enable performance activities related to financial products and/or financial and/or brokerage accounts. In ascertaining information, the content receiver may evaluate the content to determine information to include, such as by analyzing metadata that corresponds to the content and/or performing content recognition analysis on the content. The content receiver may determine to provide the financial portal in response to user input and/or in response to the occurrence of an event corresponding to an automatic and/or user defined trigger.

20 Claims, 5 Drawing Sheets

(56) References Cited

U.S. PATENT DOCUMENTS

| | | | |
|---|---|---|---|
| 2009/0174562 A1* | 7/2009 | Jacobus et al. | 340/636.1 |
| 2010/0100424 A1* | 4/2010 | Buchanan | G06Q 20/10 705/35 |
| 2010/0274714 A1* | 10/2010 | Sims | G06F 17/30017 705/40 |
| 2011/0066480 A1* | 3/2011 | Herlein | G06Q 30/0252 705/14.5 |
| 2011/0218971 A1* | 9/2011 | Cooper | 707/689 |

* cited by examiner

CONTENT-RELATED FINANCIAL PORTAL

FIELD OF THE INVENTION

This disclosure relates generally to financial trading, and more specifically to providing a financial portal that has a context related to content that is being viewed.

SUMMARY

The present disclosure discloses systems, methods, and computer program products for providing a financial portal that has a context related to viewed content. A content receiver may provide content that is received from one or more content providers. While providing such content, the content receiver may determine to provide one or more financial portals. The content receiver may ascertain context-specific information to include in the financial portal based on the content. Then, the content receiver may combine the financial portal with the content and transmit the combination to one or more display devices.

The financial portal may include various menus and/or interfaces enabling users to perform a variety of activities related to various financial products and/or various kinds of financial and/or brokerage accounts. The menus and/or interfaces may enable user to buy, trade, and/or sell various financial products; obtaining information regarding such financial products; maintaining brokerage and/or other financial accounts; and/or performing other financial related activities. Such menus and/or interfaces may be configured according to one or more sets of defaults and/or user preferences.

In ascertaining context-specific information, the content receiver may evaluate the content to determine information to include in the financial portal that is related to the content (such as identifying a financial product featured in the content and including information related to the financial product in the financial portal). In some implementations, the content receiver may evaluate the content by analyzing metadata that corresponds to the content, such as metadata included with the content. In other implementations, the content receiver may evaluate the content by performing content recognition analysis on the content itself, such as utilizing one or more audio and/or image analysis software packages.

In various implementations, the content receiver may determine to provide a financial portal based on user input. In other implementations, the content receiver may determine to provide the financial portal upon the occurrence of one or more triggering events. Such triggering events may include timers, user configured event triggers (such as event triggers received from a user and stored by the content receiver), automatic triggers included in one or more default trigger sets, and/or other methods of triggering the content receiver to provide the financial portal.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

DETAILED DESCRIPTION OF THE EMBODIMENTS

Figure 1:
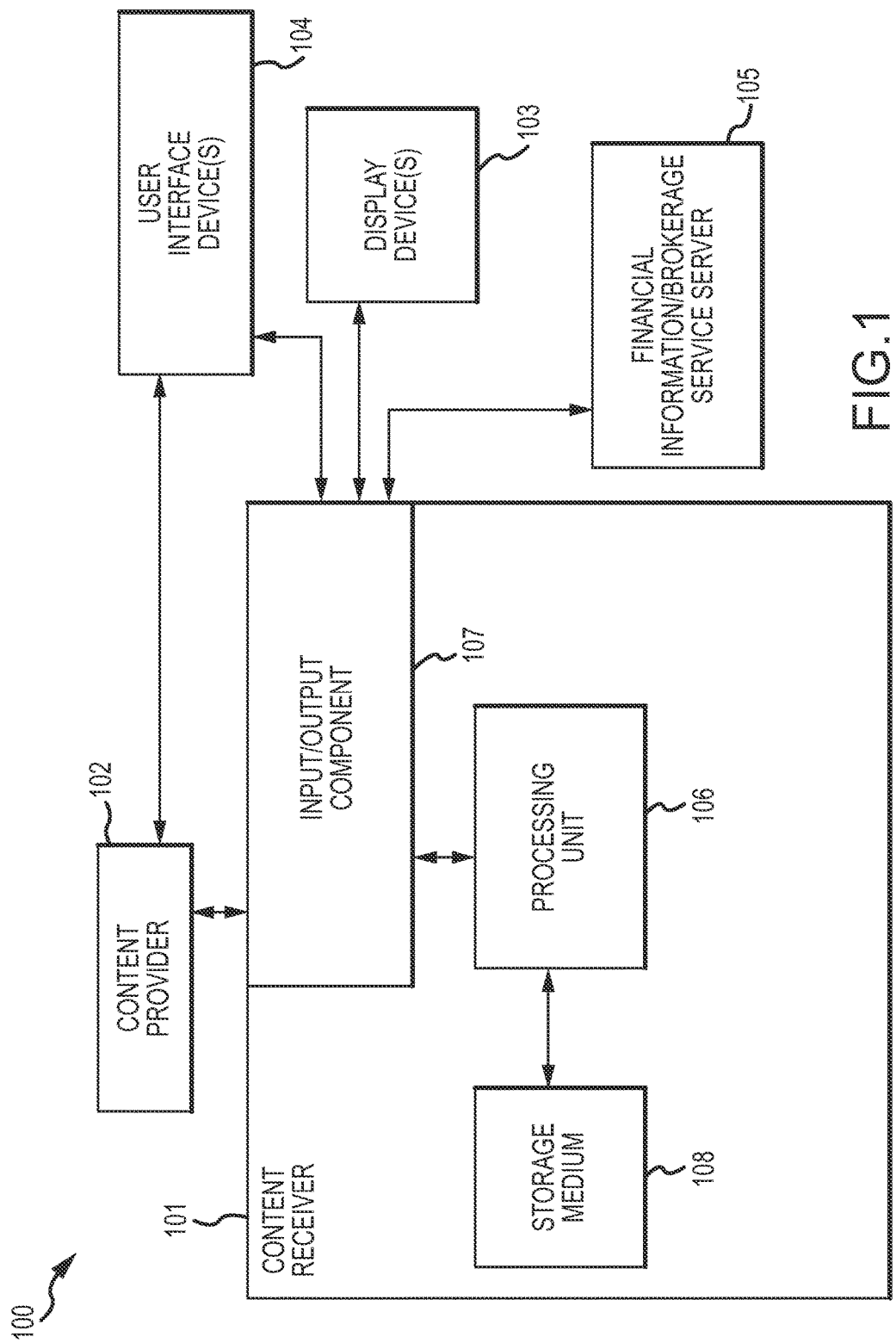
FIG. 1 is a block diagram illustrating a system for providing a content-related financial portal.

The description that follows includes sample systems, methods, and computer program products that embody various elements of the present disclosure. However, it should be understood that the described disclosure may be practiced in a variety of forms in addition to those described herein.

The buying, trade, and/or selling of various different kinds of financial products has become an increasingly common part of life for an increasingly larger portion of the population of the world. Such financial products include, but are not limited to, stocks, bonds, mutual funds, options, tradable commodities, futures, and/or any other kind of financial investment instrument and/or arrangement that can be bought, traded, and/or sold. As users are able to buy, trade, and/or sell various financial products in an increasing number of ways (such as via an in-person broker, a telephone portal, a web portal, and so on), and are able to access an increasing amount of information regarding financial products (such as via television coverage, Internet news sources, in-person broker tips, and so on), the number of users buying, trading, and/or selling such financial products may likely continue to increase.

However, there may often be a disconnect between the information pathway that users utilize to receive information upon which they make decisions regarding buying, selling, and trading financial products and the methods by which the users are able to actually perform such buying, selling, and/or trading. For example, a user may view content, presented by a content receiver, that relates to one or more financial products. Such a content receiver (which may include, but is not limited to, a television receiver, a set top box, a digital video recorder, a digital video disc player, a personal computer, a mobile computer, a cellular telephone, a smart phone, and so on) may receive the content from one or more content providers (which may include, but is not limited to, a satellite and/or cable television provider, a terrestrial broadcast television provider, a video on-demand provider, a pay-per-view movie provider, a digital video disc retailer, and so on) via one or more communication links (which may include, but is not limited to, a satellite communication link, a coaxial cable transmission link, a WiFi communication link, an Ethernet communication link, an Internet communication link, a radio frequency communication link, a retail physical distribution system, and so on).

When the user views the content, the user may decide to buy, trade, and/or sell one or more financial products based on information included in the content. However, to act on the user's decision the user may need to stop viewing the content and/or interact with one or more devices other than the content receiver in order to perform the intended buying, trading, and/or selling.

Moreover, the one or more tools that a user utilizes in order to act on the decision to buy, trade, and/or sell based on the information in the content may generally be unaware of the information that stimulated the user's decision. Thus, such tools may merely provide a generalized interface that has little or nothing to do with the information that stimulated the user to decide to buy, trade, and/or sell financial products. As such, the user may have to perform various time consuming and/or burdensome tasks (navigating various menu screens, performing searches, and so on) in order to control the tool to perform the actions that the user wishes to perform. As a result, a user may find it more difficult to perform the actions the user wishes to perform with respect to various financial products and may be less likely to be able to finish performing such actions.

The present disclosure discloses systems, methods, and computer program products for providing a financial portal that has a context related to viewed content. A content receiver may provide content that is received from one or more content providers. While providing such content, the content receiver may determine to provide one or more financial portals. Such a determination may be made in response to user input, occurrence of one or more triggering events, and/or any other event that indicates to the content receiver that the financial portal should be provided. The content receiver may ascertain context-specific information to include in the financial portal based on the content. Such ascertaining of context-specific information may be based on analyzing metadata that corresponds to the content, performing audio and/or image analysis on the content, and other such methods of obtaining context-specific information that relates to the content. Then, the content receiver may combine the financial portal with the content and transmit the combination to one or more display devices. As such, the financial portal that is provided to one or more users along with the content is related to the content that the user is viewing and may enable the user to perform various activities related to the content utilizing the financial portal in a more efficient and less time consuming way than would otherwise be possible.

FIG. 1 is a block diagram illustrating a system 100 for providing a content-related financial portal. The system 100 includes a content receiver 101, one or more content providers 102, and one or more display devices 103. The content receiver may be any kind of content receiver such as a television receiver, a set top box, a digital video recorder, a digital video disc player, a personal computer, a mobile computer, a cellular telephone, a smart phone, and/or other electronic device that is operable to receive content from the content provider. The content provider may be any kind of content provider such as a satellite and/or cable television provider, a terrestrial broadcast television provider, a video on-demand provider, a pay-per-view movie provider, a digital video disc retailer, and/or any other provider that provides content to the content receiver. The display device may be any kind of display device such as a television, a cathode ray tube display, a computer monitor, a liquid crystal display, a plasma screen display a speaker, and/or any other device capable of presenting content provided by the content receiver.

The content receiver 101 may include one or more processing units 106, one or more input/output components 107, and one or more non-transitory storage media 108 (which may take the form of, but is not limited to, a magnetic storage medium; optical storage medium; magneto-optical storage medium; read only memory; random access memory; erasable programmable memory; flash memory; and so on). The processing unit 106 may execute instructions stored in the non-transitory storage medium 107 to receive content from the content provider 102 via the input/output component 107, store such received content in the non-transitory storage medium, and/or transmit content received from the content provider and/or stored in the non-transitory storage medium to the display device 103 via the input/output component.

The processing unit 106 may also execute instructions stored in the non-transitory storage medium to provide one or more financial portals, ascertain context-specific information. As part of providing the one or more financial portals, the processing unit may determine to provide a financial portal that is related to one or more instances of content provided by the content receiver 101. Further, the processing unit may ascertain context-specific information to include in the financial portal based on the instance of content and include such context-specific information in the financial portal. Additionally, the processing unit may combine the financial portal with the instance of content (such as by overlaying the financial portal over the financial portal) and transmit the combination to the display device 103 via the input/output component 107. In this way, a user may be able to access the financial portal at the same time that he views related content.

The financial portal may include one or more menus and/or interfaces that enable a user to perform a variety of activities related to one or more financial products (such as stocks, bonds, mutual funds, options, tradable commodities, futures, and/or any other kind of financial investment instrument and/or arrangement that can be bought, traded, and/or sold) and/or one or more financial and/or brokerage accounts. Such activities may include, but are not limited to, buying, trading, and/or selling various financial products; obtaining information about buying, trading, and/or selling the various financial products; maintaining one or more brokerage and/or other financial accounts related to the user; and/or performing other activities related to one or more financial products and/or one or more financial and/or brokerage accounts associated with the user. In one or more implementations, the menus and/or interfaces may be configured according to one or more sets of defaults and/or user preferences stored in the non-transitory storage medium 108.

By way of a first example, menus and/or interfaces of the financial portal may be configured to obtain information regarding financial products from a particular financial information/brokerage service server 105 as specified a set of defaults stored in the non-transitory storage medium 108. By way of a second example, menus and/or interfaces of the financial portal may be configured to include an interface for buying, selling, and/or trading one or more financial products utilizing a brokerage service associated with the particular financial information/brokerage service server and/or with a particular user account associated with the brokerage service as specified in one or more sets of user preferences stored in the non-transitory medium.

The processing unit 106 may determine to provide the one or more financial portals in response to user input, such as user input received via one or more user interface devices 104 (which may include, but is not limited to a remote, keyboard, virtual keyboard, mouse, and/or other device operable to allow a user to interact with the content receiver 101). By way of example, a user may select a "financial portal" button on a remote control and the processing unit, in response to receiving an indication from the remote control that the user has selected the button, may determine to provide the one or more financial portals.

The processing unit 106 may also determine to provide the one or more financial portals in response to the occurrence of one or more triggering events. Such triggering events may include, but are not limited to timers, triggers set by a user related to particular events that may occur (such as a trigger set to launch a financial portal whenever a particular financial program is being provided), automatic triggers, and any other kind of triggering event. The processing unit may evaluate content that is provided for the occurrence of the one or more triggering events by analyzing metadata associated with the content, performing audio and/or image analysis on the content, and/or other such methods of determining whether an event related to content being provided is occurring.

By way of a first example, the processing unit 106 may receive input from a user via the user interface device 104 specifying to provide a financial portal every time the user views content that discusses a particular stock that the user owns shares in. The processing unit may record a trigger based on the user input in the non-transitory storage medium 108. Subsequently, while providing content, the processing unit may evaluate the user provided trigger that is stored in the non-transitory storage medium. For instance, when the processing unit is providing content that includes a news story regarding the particular stock, the processing unit may determine that that an event related to the user provided trigger has occurred and then determine to provide the financial portal.

By way of a second example, the non-transitory storage medium 108 may include one or more default triggers, such as a trigger specifying to provide a financial portal any time that content being provided includes a financial program. While providing content, the processing unit 106 may evaluate the default triggers stored in the non-transitory storage medium. For instance, when the processing unit is providing content that includes an advice program regarding the stock market, the processing unit may determine that that an event related to the user provided trigger has occurred and then determine to provide the financial portal.

The processing unit 106 may ascertain information to include in the financial portal that is specific to the context of the instance of content based on the instance of content by analyzing the instance of content in a variety of ways to determine information about the instance of content. In some implementations, the processing unit may analyze metadata that is included with the instance of content and/or otherwise corresponds to the instance of content. In other implementations, the processing unit may perform audio and/or image recognition on the instance of content, and/or other methods of determining information about the instance of content. The processing unit may determine information about the instance of content by identifying one or more financial products that are related to the instance of content. Financial products may be related to the instance of content when the financial products are discussed or otherwise referenced in the instance of content (such as a particular mutual fund when a news program mentions the particular mutual fund), when the instance of content includes one or more images and/or audio of products that relate to the financial products (such as one or more automobile corporation stocks when a commercial showcases an automobile), and/or any other way that the financial products have a relationship to audio, images, and/or video included in the at least one instance of content.

For example, the processing unit 106 may analyze metadata corresponding to an instance of content that includes a particular financial program and determine that includes discussion of a particular stock. As such, the processing unit may contact the financial information/brokerage service server 105 via the input/output component 107 to obtain information regarding the particular stock (such as a stock price for the particular stock, news articles related to the particular stock, data to generate an interface for buying, trading, and/or selling the particular stock, and/or other information that relates to the particular stock). The processing unit may then include the information obtained from the financial information/brokerage service server in the financial portal. Thus, the financial portal has a relation to the instance of content because it includes information that is specific to the context of the instance of content.

Figure 2:
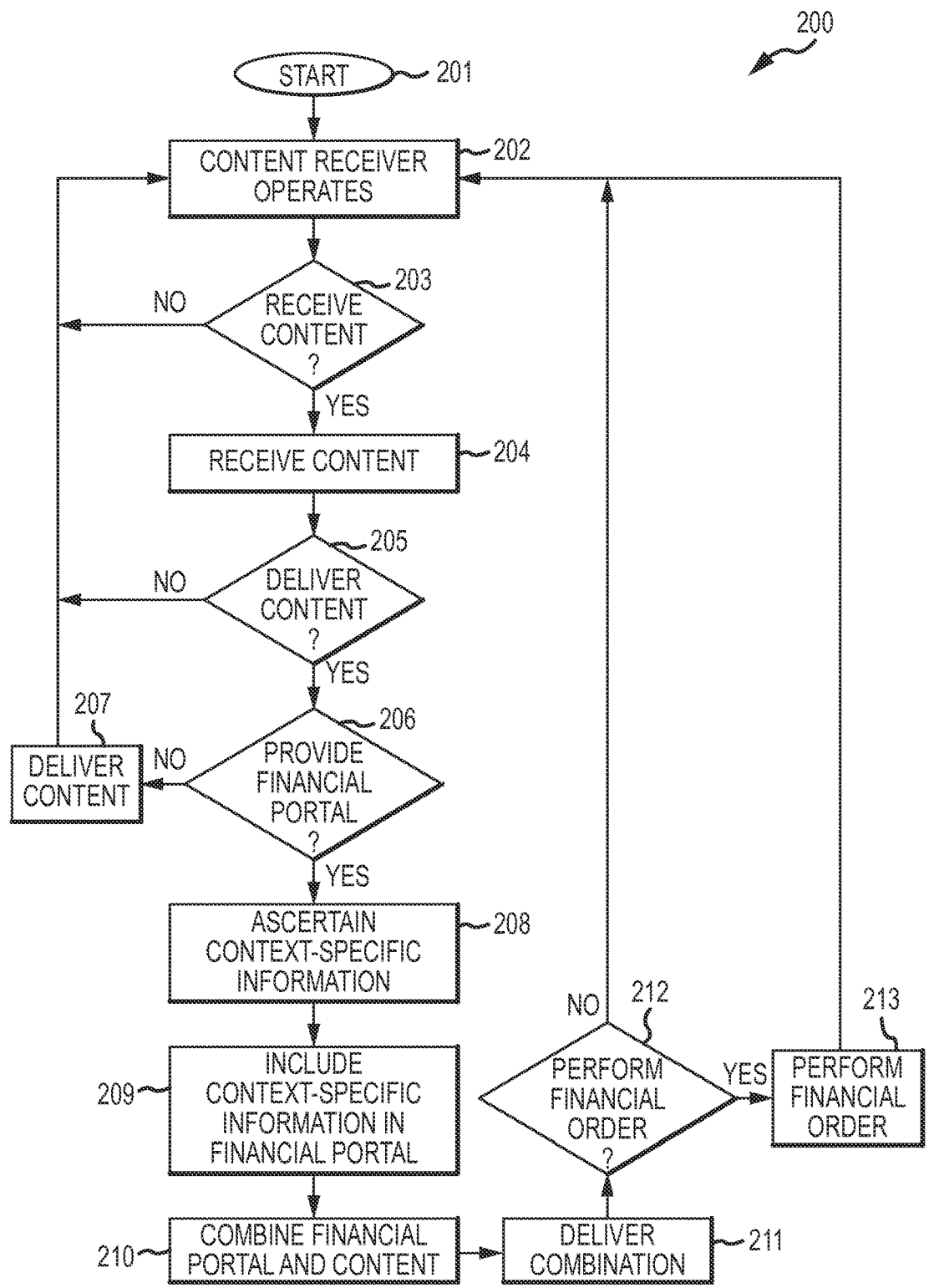
FIG. 2 is a flow chart illustrating a method for providing a content-related financial portal. This method may be performed by the system of FIG. 1.

FIG. 2 illustrates a method 200 for providing a content-related financial portal. The method 200 may be performed by the content receiver 101 of FIG. 1. The flow begins at block 201 and proceeds to block 202 where the content receiver 101 operates. The flow then proceeds to block 203 where the content receiver determines whether or not content has been received. If so, the flow proceeds to block 204 where the content receiver receives the content. Otherwise, the flow returns to block 202 where the content receiver continues to operate.

At block 205, after the content receiver 101 receives content, the content receiver determines whether or not to provide received content. If not, the flow returns to block 202 where the content receiver continues to operate. Otherwise, the flow proceeds to block 206 where the content receiver determines whether or not to provide a financial portal along with the content. If not, the flow proceeds to block 207 and the content receiver delivers the received content to the display device 103 before the flow returns to block 202 and the content receiver continues to operate. Otherwise, the flow proceeds to block 208.

At block 208, after the content receiver 101 determines to provide a financial portal along with the content, the content receiver ascertains context-specific information related to the received content to include in the financial portal. The flow then proceeds to block 209 where the content receiver includes the context-specific information in the financial portal. Then, the flow proceeds to block 210 where the content receiver combines the received content with the financial portal. Next, the flow proceeds to block 211 where the content receiver delivers the combination of the received content and the financial portal to the display device 103.

At block 212, after the content receiver 101 delivers the combination of the received content and the financial portal to the display device 103, the content receiver determines whether to perform one or more financial orders based on the provided financial portal. Such financial orders may include, but are not limited to, an order to buy, trade, and/or sell one or more financial products, an order to obtain information regarding one or more financial products, and/or any other kind of order that may be received from a user utilizing one or more interfaces provided by the financial portal. If the content receiver determines not to perform a financial order, the flow returns to block 202 where the content receiver continues to operate. Otherwise, the flow proceeds to block 213 where the content receiver performs the financial order (such as via the financial information/brokerage service server 105) before the flow returns to block 202 and the content receiver continues to operate.

Although method 200 is illustrated and described as a discrete series of linear steps, it is understood that in various implementations other contemplated arrangements are possible. For example, although method 200 illustrates operations of receiving content, generating and providing financial portals, and performing financial orders as sequential operations, in various implementations one or more of these operations may be performed simultaneously and/or repetitively. The illustration and description of method 200 as a discrete series of linear steps is merely for the purposes of clarity.

Figure 3A:
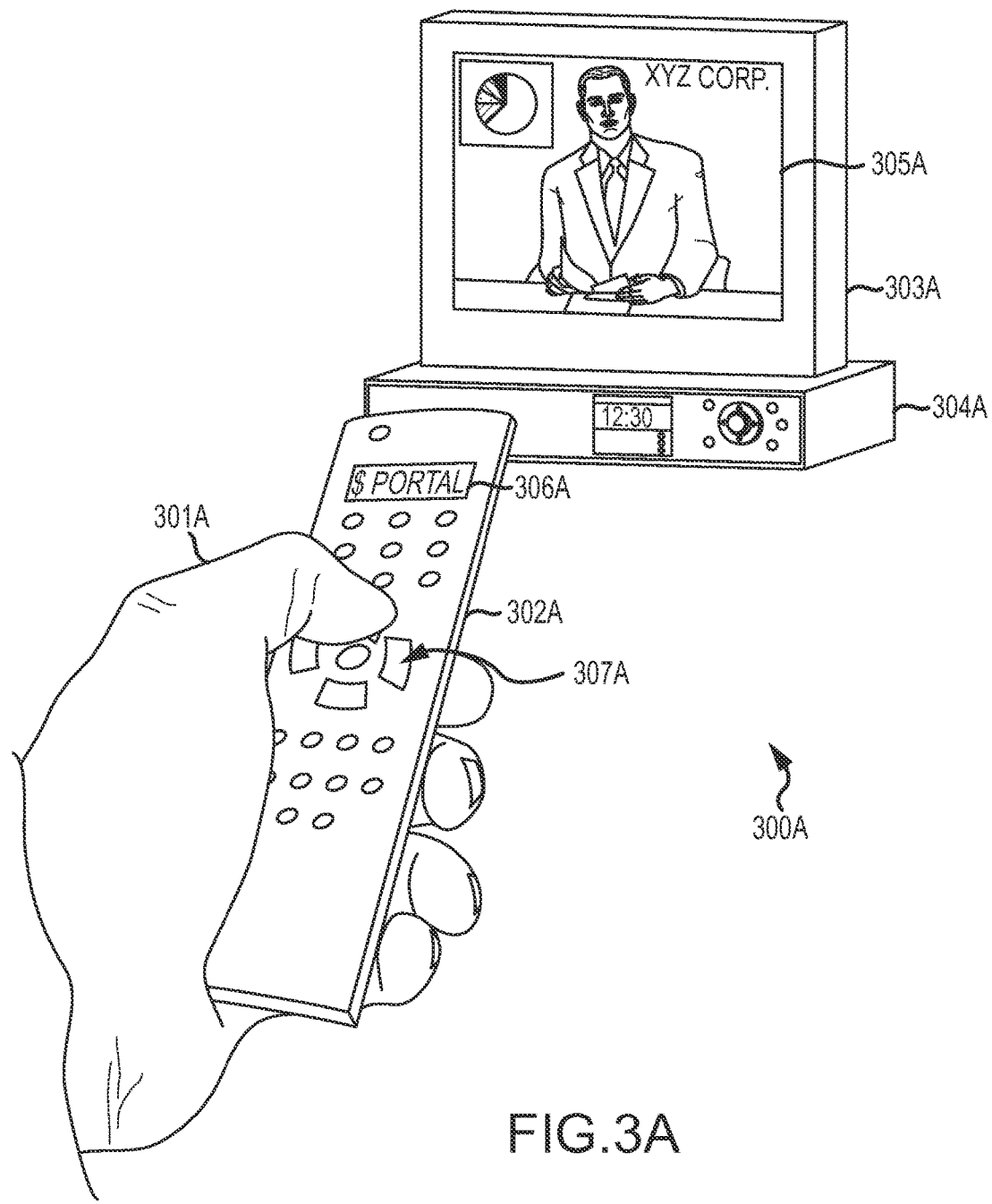
FIGS. 3A-3C are diagrams illustrating a user utilizing a system for providing a content-related financial portal. The system may be the system of FIG. 1.
Figure 3B:
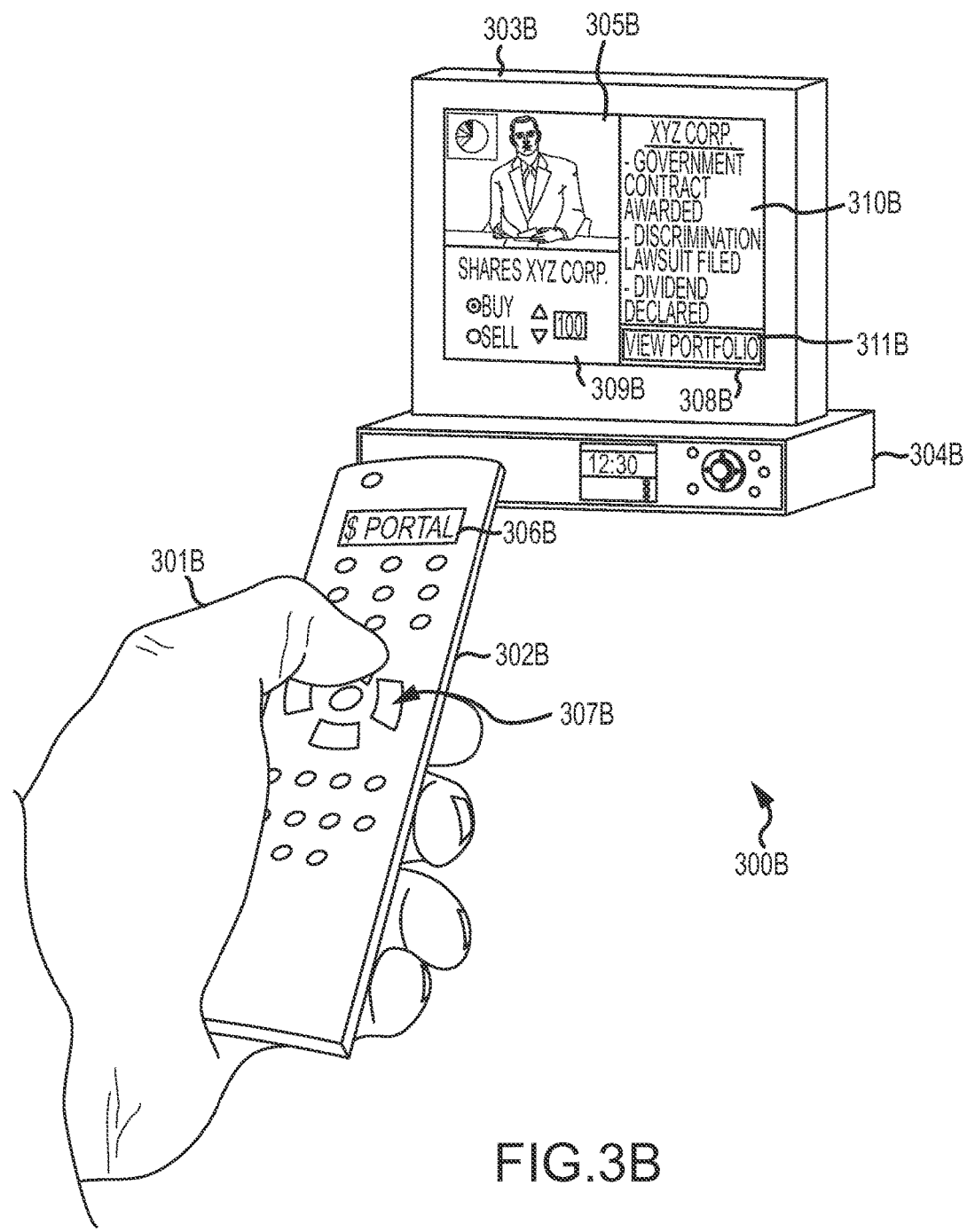
Figure 3C:
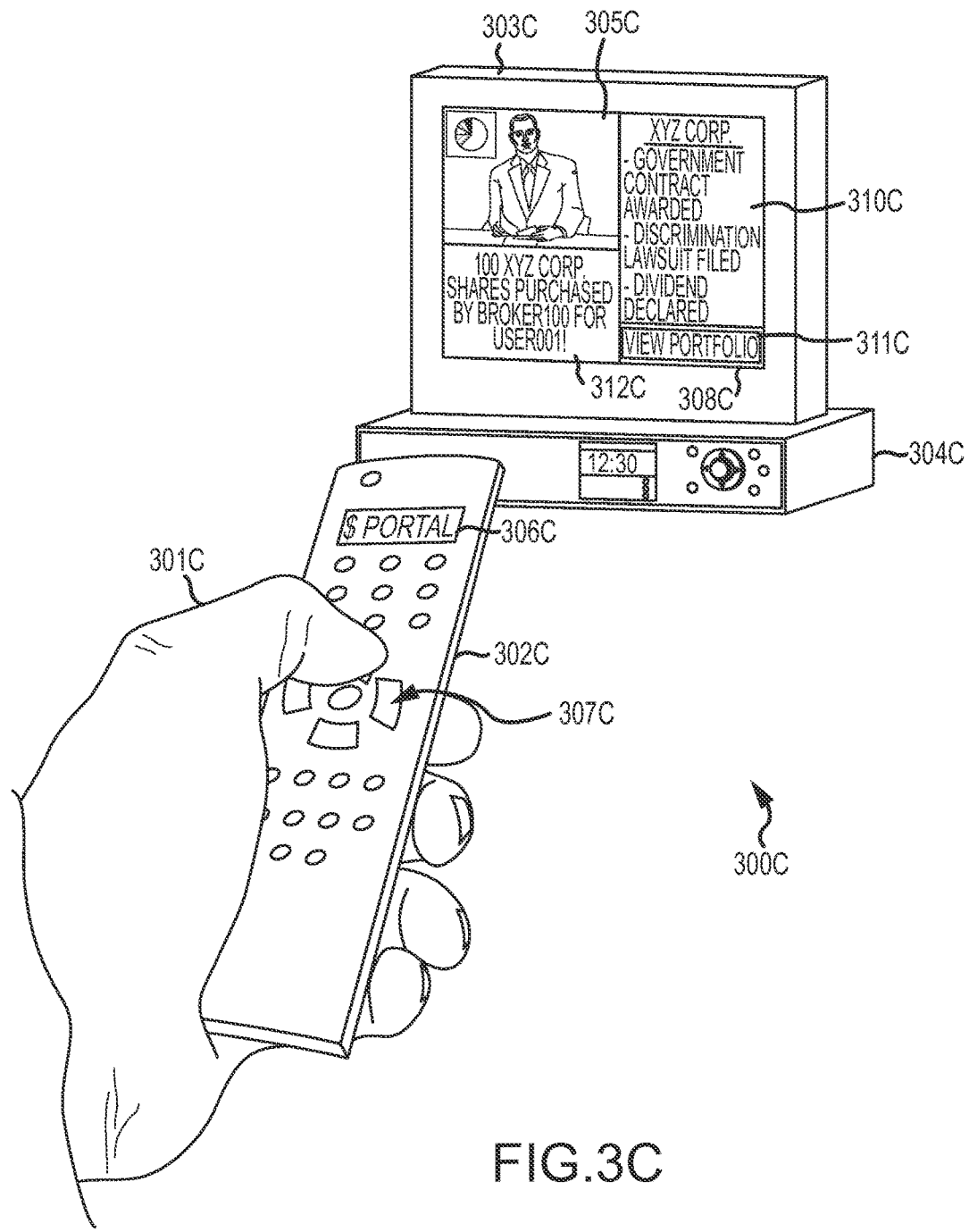

FIGS. 3A-3C illustrate a user 301A-301C utilizing a system 300A-300C for providing a content-related financial portal. In various implementations, the system 300A-300C may be the system of FIG. 1. As illustrated in FIGS. 3A-3C, a television 303A-303C displays content received from a set top box 304A-304C on a screen 305A-305C. Also as illustrated, the user 301A-301C is able to control the set top box 304A-304C utilizing a remote control 302A-302C which includes a financial portal button 306A-306C and a selection button configuration 307A-307C.

In FIG. 3A, the television 303A displays a financial program provided by the set top box 304A on the screen 305A. As illustrated, the financial program is presenting a segment discussing XYZ Corp.

Subsequently, the user 301A presses the financial portal button 306A on the remote control 302A. In response, as illustrated in FIG. 3B, the set top box 304B: analyzes the content being provided to the television 303B, determines that the XYZ Corp. is being discussed by the content, ascertains information regarding XYZ Corp. as well as information regarding the user's brokerage account, includes such information in a financial portal 308B, combines the financial portal 308B with the content being transmitted to the television 303B, and transmits the content overlaid with the financial portal 308B that includes the information to the television 303B. The television 303B then displays with content with the overlaid financial portal 308B on the screen 305B.

As illustrated, the financial portal 308B includes an interface 309B that the user 301B can manipulate utilizing the selection button configuration 307B to buy or sell one or more shares of XYZ Corp. Also as illustrated, the financial portal 308B includes news updates regarding XYZ Corp. 310B and a selection element 311B enabling the user 301B to view information regarding the financial portfolio of their brokerage account.

FIG. 3C illustrates the financial portal 308C after the user 301C has utilized the selection button configuration 307C to buy 100 shares of XYZ Corp. As illustrated, the financial portal 308C still includes the news updates regarding XYZ Corp. 310C and the selection element 311C enabling the user 301C to view information regarding the financial portfolio of their brokerage account. However, the interface 309B for buying or selling one or more shares of XYZ Corp. has been replaced with a confirmation message 312C indicating that 100 shares of XYZ Corp. stock have been purchased for the user's brokerage account (illustrated as the account identified as USER001 for the broker identifier BROKER100).

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

The invention claimed is:

1. A method for providing a financial portal related to received audiovisual content, the method comprising:
  receiving, by a content receiver, audiovisual content, the content receiver including a processing unit, a non-transitory storage, an input component and an output component;
  sending, by the content receiver, the received audiovisual content to a display device for presentation to a user;
  storing, in the non-transitory storage of the content receiver, one or more user-defined triggers and items of financial interest to the user, wherein the one or more user-defined triggers are set by the user, and wherein the one or more user-defined triggers define triggering events for when to present the financial portal to the user on the display device;
  analyzing, by the content receiver, the received audiovisual content;
  in response to analyzing the received audiovisual content, comparing the analyzed audiovisual content to the stored one or more user-defined triggers;
  detecting, by the content receiver, an occurrence of a triggering event based on a match of the compared audiovisual content to at least one of the one or more user-defined triggers, wherein the triggering event causes the financial portal to be presented to the user on the display device; and
  in response to detecting the triggering event:
    analyzing, by the content receiver, the received audiovisual content to determine at least one context-specific information based on a comparison of the received audiovisual content and the items of financial interest to the user;

sending, by the content receiver, a combination of the financial portal and the received audiovisual content for simultaneous display on the display device, wherein the financial portal includes the at least one context-specific information related to the items of financial interest to the user; and permitting, by the content receiver, the user, using, the financial portal, to initiate a financial order.

2. The method of claim 1, wherein analyzing the received audiovisual content to determine the at least one context-specific information further comprises identifying at least one financial product related to the received audiovisual content; and wherein the financial portal includes data regarding the at least one financial product.

3. The method of claim 2, wherein the at least one financial product is related to the received audiovisual content because at least one reference to the at least one financial product is included in the received audiovisual content.

4. The method of claim 2, further comprising contacting at least one financial information provider to obtain the data regarding the at least one financial product.

5. The method of claim 1, wherein analyzing the received audiovisual content to determine the at least one context-specific information further comprises:

analyzing metadata associated with the received audiovisual content.

6. The method of claim 1, wherein analyzing the received audiovisual content to determine the at least one context-specific information further comprises:

performing at least one of an audio recognition upon the received audiovisual content and an image recognition upon the received audiovisual content.

7. The method of claim 1, wherein the occurrence of the triggering event is at least one of an expiration of a timer, an occurrence of a phrase in a selected audiovisual content, and a selection of a particular audiovisual content for presentation.

8. The method of claim 1, wherein sending to the display device the combination of the financial portal and the received audiovisual content further comprises:

overlaying the financial portal over at least a portion of the received audiovisual content.

9. The method of claim 1 further comprising:

in response to detecting the triggering event, providing, from the content receiver, one or more signals that instruct a financial service server to provide the at least one context-specific information to the content receiver; and in response to receiving the financial order from the user via the financial portal, providing, from the content receiver, one or more other signals that instruct the financial service server to perform the financial order.

10. A content receiver that provides a financial portal related to received audiovisual content, comprising:

an input component configured to:

receive audiovisual content from an audiovisual content provider, and receive one or more user-defined triggers and items of financial interest to a user, wherein the one or more user-defined triggers are set by the user, and wherein the one or more user-defined triggers define triggering events for when to present the financial portal to the user on a display device;

an output component configured to send the received audiovisual content to the display device;

a processing unit, communicably connected to the input component and to the output component; and a non-transitory storage communicably connected to the processing unit, the non-transitory storage including instructions that, when executed, configure the processing unit to:

store, in the non-transitory storage, the one or more user-defined triggers and the items of financial interest to the user, analyze the received audiovisual content, in response to analyzing the received audiovisual content, compare the analyzed audiovisual content to the stored one or more user-defined triggers, detect an occurrence of a triggering event based on a match of the compared audiovisual content to at least one of the one or more user-defined triggers, wherein the triggering event causes the financial portal to be presented to the user on the display device, and in response to detecting the triggering event:

analyze the received audiovisual content to determine at least one context-specific information based on a comparison of the received audiovisual content and the items of financial interest to the user, and send to the display device a combination of the financial portal and the received audiovisual content for simultaneous display, the financial portal including the at least one context-specific information related to the items of financial interest to the user and overlaid over at least a portion of the received audiovisual content.

11. The content receiver of claim 10, wherein the processing unit is configured to compare the analyzed audiovisual content to the stored items of financial interest to the user to determine the at least one context-specific information by identifying at least one financial product related to the received audiovisual content; and wherein the financial portal includes at least one of data regarding the at least one financial product and at least one interface to trade the at least one financial product in the financial portal.

12. The content receiver of claim 11, wherein the at least one financial product is related to the received audiovisual content because at least one reference to the at least one financial product is included in the received audiovisual content.

13. The content receiver of claim 11, wherein the processing unit is further configured to contact at least one financial information provider utilizing the output component to obtain the data regarding the at least one financial product.

14. The content receiver of claim 10, wherein the processing unit is configured to analyze the received audiovisual content to determine the at least one context-specific information by performing at least one of an audio recognition upon the received audiovisual content and an image recognition upon the received audiovisual content.

15. The content receiver of claim 10, wherein the processing unit is configured to analyze the received audiovisual content to determine the at least one context-specific information by analyzing metadata associated with the received audiovisual content.

16. The content receiver of claim 10, wherein the occurrence of the triggering event includes at least one of an expiration of a timer, an occurrence of a phrase in a selected audiovisual content, and a selection of a particular audiovisual content for presentation.

17. The content receiver of claim 10, further comprising in response to detecting the triggering event:
    receiving a financial order from the user via the financial portal; and
    sending the received financial order to a third party to be executed.

18. The content receiver of claim 10, wherein analyzing the received audiovisual content further comprises analyzing metadata associated with the received audiovisual content.

19. A computer program product embodied in a non-transitory computer readable medium, wherein the computer program product comprises instructions that, when executed by a processor, perform the steps of:
    receiving audiovisual content from an audiovisual content provider;
    sending the received audiovisual content to a display device;
    receiving one or more user-defined triggers and an indication of items of financial interest to a user, the one or more user-defined triggers being set by the user and defining triggering events for when to present a financial portal to the user on the display device;
    analyzing the received audiovisual content;
    in response to analyzing the received audiovisual content, comparing the analyzed audiovisual content to the received one or more user-defined triggers;
    detecting an occurrence of a triggering event based on a match of the compared audiovisual content to at least one of the one or more user-defined triggers, wherein the triggering event causes the financial portal to be presented to the user on the display device;
    upon detecting the triggering event, sending a combination of the financial portal and the received audiovisual content to the display device, wherein the financial portal includes context-specific information related to the items of financial interest to the user; and
    permitting the user, using the financial portal, to initiate a financial order.

20. A method for providing a financial portal related to received audiovisual content, the method comprising:
    receiving, by a content receiver, audiovisual content, the content receiver including a processing unit, a non-transitory storage, an input component and an output component;
    sending, by the content receiver, the received audiovisual content to a display device for presentation to a user;
    storing, in the non-transitory storage of the content receiver, one or more user-defined triggers and items of financial interest to the user, wherein the one or more user-defined triggers being set by the user and defining triggering events for when to present the financial portal to the user on the display device;
    analyzing, by the content receiver, the received audiovisual content, wherein the analyzing includes at least one of analyzing metadata, analyzing audio and analyzing video corresponding to the received audiovisual content;
    comparing the analyzed audiovisual content to the stored one or more user-defined triggers;
    detecting, by the content receiver, an occurrence of a triggering event based on a match of the compared audiovisual content to at least one of the one or more user-defined triggers, wherein the triggering event causes the financial portal to be presented to the user on the display device;
    in response to detecting the triggering event, presenting the financial portal on the display device, the financial portal including at least one context-specific information based on a comparison of the received audiovisual content and the items of financial interest to the user;
    receiving a financial order from the user via the financial portal; and
    sending the received financial order to a third party to be executed.

* * * * *

UNITED STATES PATENT AND TRADEMARK OFFICE
CERTIFICATE OF CORRECTION

| | |
|---|---|
| PATENT NO. | : 10,453,126 B2 |
| APPLICATION NO. | : 13/042319 |
| DATED | : October 22, 2019 |
| INVENTOR(S) | : Corbin R. Latham et al. |

Page 1 of 1

It is certified that error appears in the above-identified patent and that said Letters Patent is hereby corrected as shown below:

In the Claims

Column 9, Claim 1, Line 7:
"the user, using, the" should be: --the user, using the--

Signed and Sealed this
Thirtieth Day of March, 2021

Drew Hirshfeld
*Performing the Functions and Duties of the*
*Under Secretary of Commerce for Intellectual Property and*
*Director of the United States Patent and Trademark Office*